US009541441B2

(12) United States Patent
Prero et al.

(10) Patent No.: US 9,541,441 B2
(45) Date of Patent: Jan. 10, 2017

(54) INTEGRATED MEASURING SCOOP APPARATUS

(75) Inventors: Gabriel Prero, Chicago, IL (US); Craig R. Sawicki, Roselle, IL (US); Gerald Christian, Hobart, IN (US)

(73) Assignee: TricorBraun Inc., St. Louis, MO (US)

(*) Notice: Subject to any disclaimer, the term of this patent is extended or adjusted under 35 U.S.C. 154(b) by 0 days.

(21) Appl. No.: 13/588,565

(22) Filed: Aug. 17, 2012

(65) Prior Publication Data

US 2014/0001179 A1 Jan. 2, 2014

Related U.S. Application Data

(60) Provisional application No. 61/525,045, filed on Aug. 18, 2011.

(51) Int. Cl.
*B65D 51/24* (2006.01)
*G01F 19/00* (2006.01)
*B65D 77/24* (2006.01)
*B65D 41/62* (2006.01)

(52) U.S. Cl.
CPC .......... *G01F 19/002* (2013.01); *B65D 77/245* (2013.01)

(58) Field of Classification Search
CPC ..... G01F 19/002; B65D 23/10; B65D 77/245; B65D 23/12; B65D 41/56; B65D 41/26; A47G 21/04; A47G 23/10
USPC .............................. 206/541; 220/212.5, 735
See application file for complete search history.

(56) References Cited

U.S. PATENT DOCUMENTS

| 5,285,924 A | 2/1994 | Morris |
| 5,347,865 A | 9/1994 | Mulry et al. |
| 5,705,212 A | 1/1998 | Atkinson |
| 5,992,667 A * | 11/1999 | Huang ........................ 220/212 |
| 6,382,459 B1 | 5/2002 | Liu |
| 7,175,041 B2 * | 2/2007 | Ekkert ........................ 220/212 |
| 2002/0060220 A1 * | 5/2002 | Torniainen et al. ......... 220/212 |
| 2003/0029868 A1 * | 2/2003 | Davidov et al. ............ 220/212 |
| 2004/0099566 A1 * | 5/2004 | Kipperman et al. ......... 206/541 |
| 2005/0035122 A1 * | 2/2005 | Ekkert ........................ 220/212 |
| 2005/0160807 A1 | 7/2005 | Kilduff et al. |
| 2010/0051631 A1 * | 3/2010 | Blomdahl et al. ........... 220/735 |
| 2011/0126619 A1 | 6/2011 | Robbins |
| 2013/0081364 A1 * | 4/2013 | Piscopo ......................... 53/492 |

FOREIGN PATENT DOCUMENTS

WO 2007/125064 A1 11/2007

OTHER PUBLICATIONS

Notification of Transmittal of the International Search Report and the Written Opinion of the International Searching Authority, or the Declaration, Nov. 2, 2012.

* cited by examiner

*Primary Examiner* — J. Gregory Pickett
*Assistant Examiner* — Niki M Eloshway
(74) *Attorney, Agent, or Firm* — Husch Blackwell LLP

(57) ABSTRACT

An integrated measuring scoop apparatus includes a mounting ring with at least a first mounting protrusion extending inwardly from an inner surface of the mounting ring; a measuring scoop having a bowl and an handle; and a recessed area in an exterior surface of the bowl and terminating in an upper support surface being arranged for engagement with the mounting protrusion and the handle being arranged for engagement with the mounting protrusion.

16 Claims, 6 Drawing Sheets

INTEGRATED MEASURING SCOOP APPARATUS

CROSS REFERENCES

This application claims priority to U.S. Provisional Patent Application No. 61/525,045, filed Aug. 18, 2011.

TECHNICAL FIELD OF THE INVENTION

The present invention relates generally to measuring and dispensing devices and, more particularly, to an apparatus for integrating a measuring and dispensing device into a package.

BACKGROUND OF THE INVENTION

Powdered and granulated products are sometimes sold to consumers in relatively large, bulk containers. In order for the consumer to make use of the product, it is frequently necessary or desirable for a specific quantity of the product to be measured and dispensed from the container. An example of such a product for which this would be necessary are dietary supplements. In order to facilitate measuring and dispensing by the consumer, producers frequently include a measuring scoop in the container. In most cases the measuring scoop provided is made of plastic and is relatively small relative to the interior space of the container.

During shipment of the product, the container is continually moved, jostled, and handled with various degrees of care. All of this movement promotes settling of the contents.

Typically, this movement and the resulting settling can result in the measuring scoop being buried to at least some degree in the powdered or granulated material within the container. Particularly when the container is first opened by the consumer—when the container is full—this makes finding the scoop difficult. The consumer must dig through the material to try to find the scoop. This is messy and unsanitary.

There are prior art products that incorporate a means to mount a scoop near the open top of a container. However, these products require either separate structures distinct from the rest of the container or fairly elaborate molds.

Therefore, it would be advantageous to provide an apparatus that ensures appropriate placement of a measuring scoop in an accessible location within a container while being easily integrated into the overall container structure.

SUMMARY OF THE INVENTION

One aspect of the invention generally pertains to a measuring scoop apparatus that secures the measuring scoop in a readily accessible position within a container.

Another aspect of the invention pertains to a measuring scoop apparatus that is integrated with the container and requires a very limited amount of additional material or molding.

In accordance with the above aspects of the invention, there is provided an integrated measuring scoop apparatus includes a mounting ring with at least a first mounting protrusion extending inwardly from an inner surface of the mounting ring; a measuring scoop having a bowl and an handle; and a recessed area in an exterior surface of the bowl and terminating in an upper support surface being arranged for engagement with the mounting protrusion and the handle being arranged for engagement with the mounting protrusion.

There is also provided a container having an integrated measuring scoop that includes a container body; a container top; a mounting ring with at least one mounting protrusion extending inwardly from an inner surface of the mounting ring and means for removably connecting the container top with the mounting ring to close the container; a measuring scoop having a bowl and an handle; and a recessed area in an exterior surface of the bowl and terminating in an upper support surface being arranged for engagement with the mounting protrusion and the handle being arranged for engagement with the mounting protrusion.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
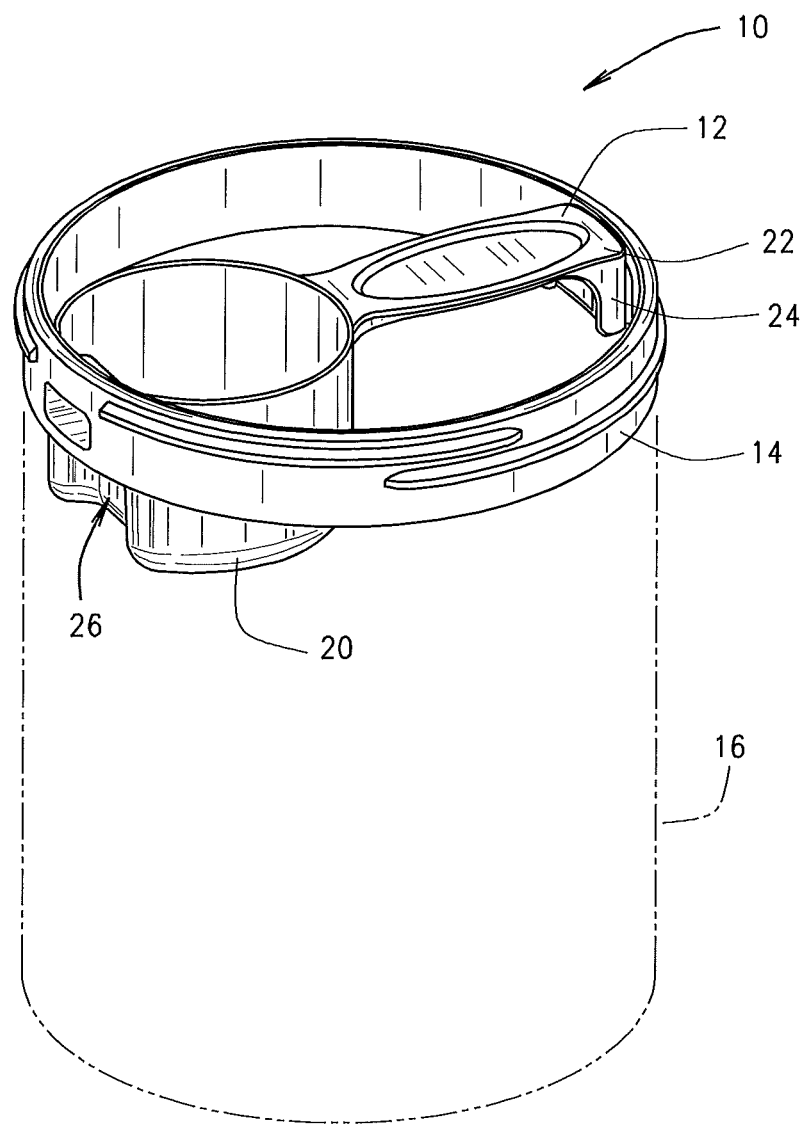
FIG. 1 is a perspective view of an integrated measuring scoop apparatus according to an embodiment of the present invention.
Figure 2:
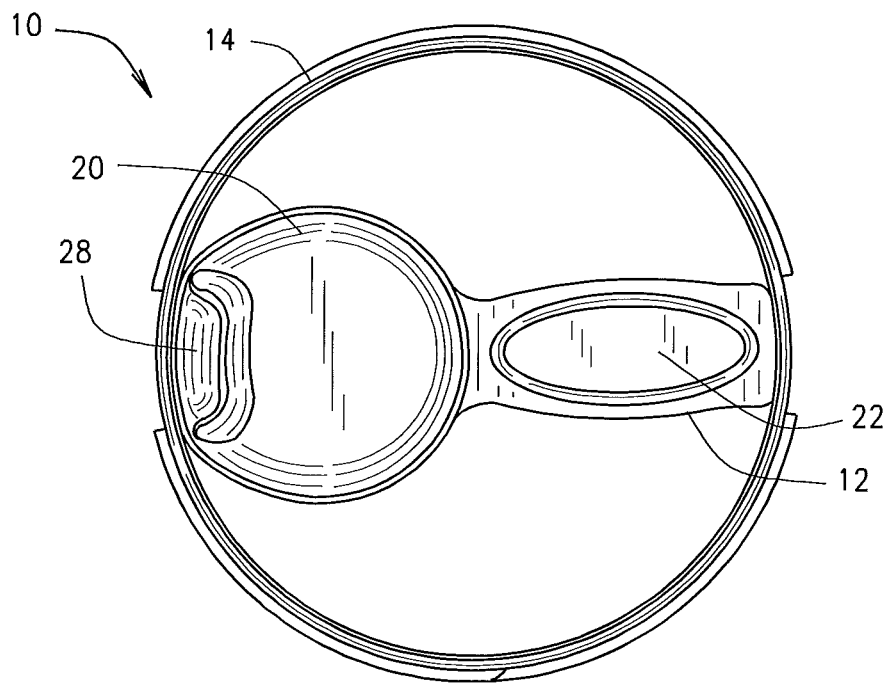
FIG. 2 is a top view of the integrated measuring scoop apparatus of FIG. 1.
Figure 3:
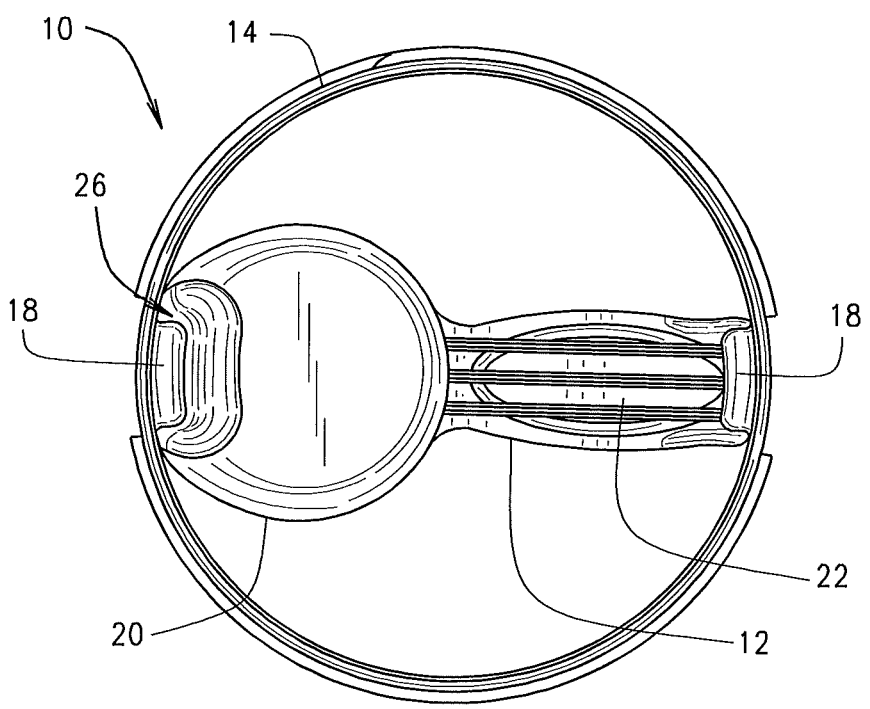
FIG. 3 is a bottom view of the integrated measuring scoop apparatus of FIG. 1.
Figure 4:
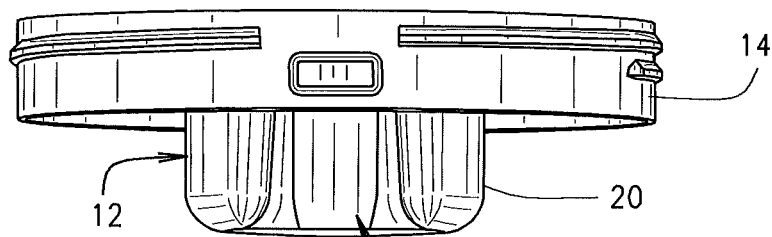
FIG. 4 is a front view of the integrated measuring scoop apparatus of FIG. 1.
Figure 5:
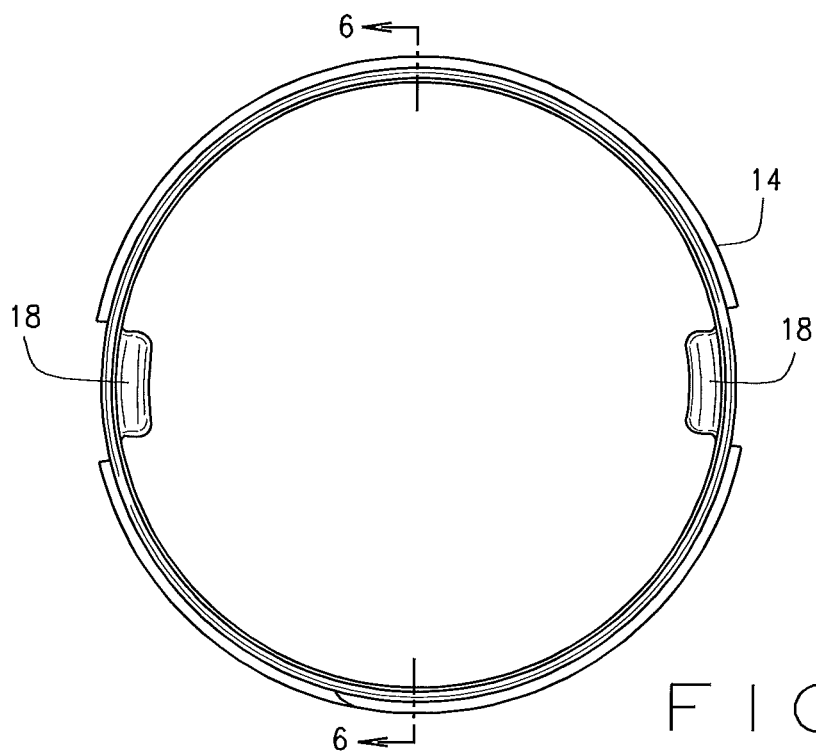
FIG. 5 is a top view of a mounting ring for an integrated measuring scoop apparatus according to another embodiment.
Figure 6:
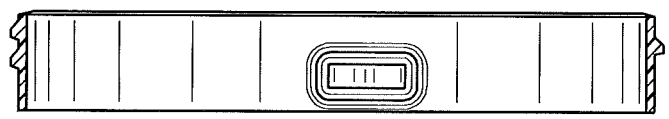
FIG. 6 is a cross-sectional view of the mounting ring of FIG. 5 taken along the line 6-6.
Figure 7:
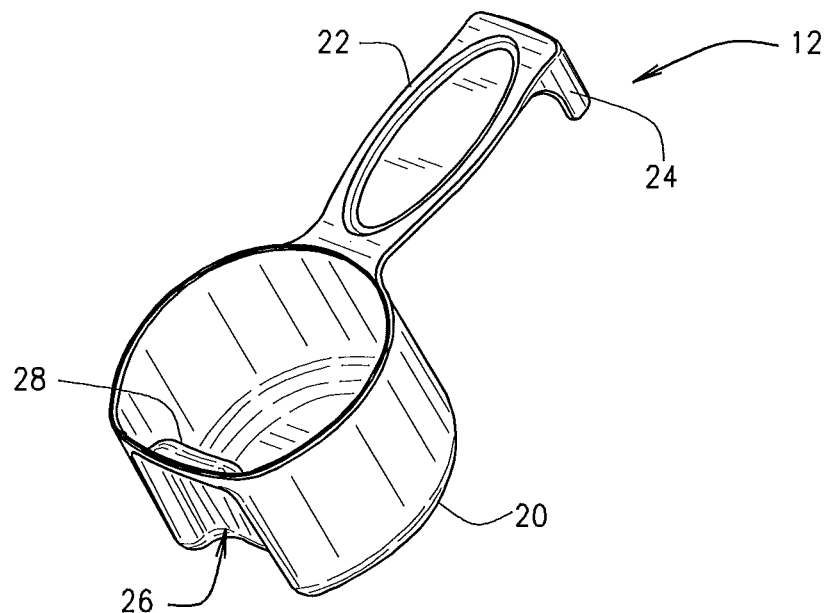
FIG. 7 is a perspective view of a measuring scoop for an integrated measuring scoop apparatus according to another embodiment.
Figure 8:
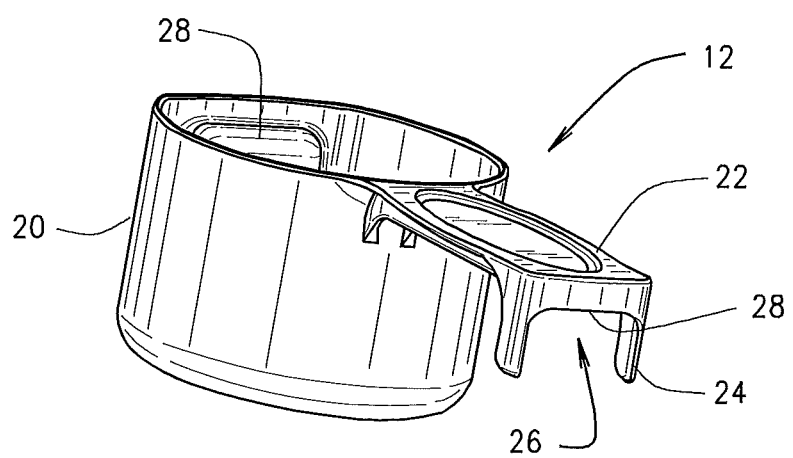
FIG. 8 is a rear perspective view of the measuring scoop of FIG. 7.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

FIGS. 1-8 illustrate embodiments of an integrated measuring scoop apparatus 10. The apparatus 10 includes a measuring scoop 12 and a mounting ring 14. In the illustrated embodiment, the mounting ring 14 is integrally molded with a container 16 in which the apparatus 10 will be used. However, the mounting ring 14 may alternately be separate from the container and connected thereto by a variety of means, such as mating threads, press fit, glues, sonic welding, etc. While the mounting ring 14 in the illustrated embodiment is shown with a circular shape, it may be provided with any shape that corresponds to the desired shape of the container with which it is to be used.

The mounting ring 14 in the illustrated embodiment is provided with threads on an outer surface of the ring 14 to engage mating threads on the inside of a screw-on cap used with the container. Alternately, the mounting ring 14 may be provided with a hinged connection with the cap, in which case the hinge and the cap may remain separate components or the mounting ring, hinge, and cap may be integrally molded. The mounting ring 14 may also alternately be provided with snap ring on its exterior surface to enable a snap fit with the cap.

Mounting protrusions 18 are provided along the inner surface of the mounting ring 14. In the illustrated embodiment, the protrusions 18 are arranged approximately facing one another on opposite sides of the mounting ring 14. The protrusions 18 are advantageously molded into the mounting ring 14 in the preferred embodiment. In the illustrated embodiment, the protrusions 18 are generally rectangular. However, the protrusions 18 may take other shapes so long as those shapes continue to coordinate with the corresponding portions of the measuring scoop 12 as discussed below. Preferably, the protrusions 18 will be identical to one another. Due to the integral molded nature of the protrusions 18 and the mounting ring 14, there may be corresponding recesses in the outer surface of the mounting ring 14 where the protrusions 18 are located. These recesses are not essential to the operation of the invention.

The measuring scoop 12 is providing with a bowl 20 and a handle 22. The length of the measuring scoop, measured from the end of the bowl 20 to the end of the handle 22, corresponds to the inside diameter of the mounting ring 14, more specifically, being only slightly less than the inside diameter of the mounting ring 14. This allows the measuring scoop 12 to fit within the mounting ring 14 while ensuring the necessary level of contact between the ends of the measuring scoop 12 and the protrusions 18 of the mounting ring 14.

The bowl 20 of the measuring scoop 12 may be providing with any shape. However, in illustrated embodiment, the bowl 20 will have a generally round or oval shape that roughly allows the edge of the bowl 20 to follow the curvature of the mounting ring 14. In embodiments where the container, and thus the mounting ring 14, are rectangular, square or another shape, it will be advantageous to use a bowl 20 shape that generally allows the edge of the bowl 20 to follow and conform with the interior of the mounting ring 14. This helps ensure proper engagement between the bowl end of the measuring scoop 12 and the protrusion 18 that will support it.

Similarly, the end of the handle 22 of the measuring scoop may be provided with a shape that corresponds with that of the mounting ring 14. In addition, the end of the handle 22 is provided with a downwardly extending flange 24. The flange 24 provides additional vertical surface area that is necessary for the engagement of the handle end of the measuring scoop 12 with the protrusion that will support it.

Each of the bowl 20 and the handle flange 24 is further provided with a recessed slot 26. The slots 26 have a width and a depth that will generally correspond to the width and depth of the protrusions 18. Each slot 26 terminates at its upper end in an upper support surface 28. The slots 26 are open at their lower ends. This arrangement allows the ends of the measuring scoop 12 to be slid onto the protrusions 18 from above until the upper support surfaces 28 of the slots 26 engage the top side of the protrusions 18. The matching dimensions of the protrusions 18 and slots 26, particularly the similar widths and depths of these structures, helps limit excess movement of the measuring scoop 12 relative to the mounting ring 14 and keeps the measuring scoop 12 in place. Further, it is advantageous to position the protrusions 18 and the slots 26 such that the top of the measuring scoop 12 is positioned approximately even with the top of the mounting ring 14. This results in the top of the container, when secured onto the mounting ring 14, cooperating with the mounting ring 14 and protrusions 18 to keep the measuring scoop 12 in place by limiting the upward range of movement of the measuring scoop 12, thereby preventing the measuring scoop 12 from moving off of the protrusions when the container is moved.

Providing the protrusions 18 and the slots 26 with the same dimensions allows the measuring scoop 12 to be positioned with the mounting ring 14 in either orientation. While the illustrated embodiment uses only two protrusions 18, which corresponds to the two slots 26 in the measuring scoop 12, alternate embodiments may include additional protrusions 18 to provide additional storage positions for the measuring scoop 12. However, in most cases, the protrusions 18 will still be provided in pairs around the inner surface of the mounting ring 14.

Figure 9:
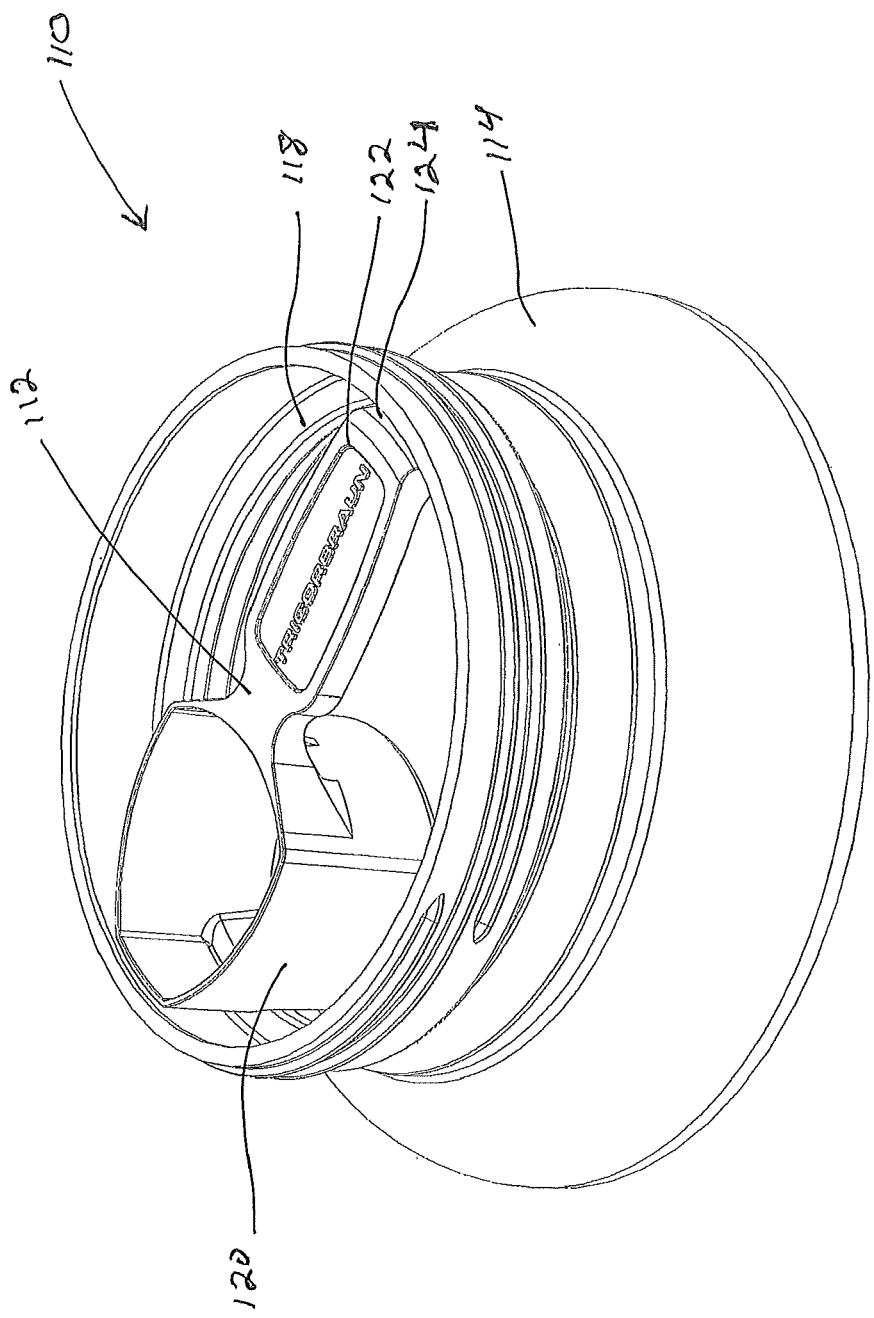
FIG. 9 is a perspective view of an integrated measuring scoop apparatus according to an alternate embodiment.
Figure 10:
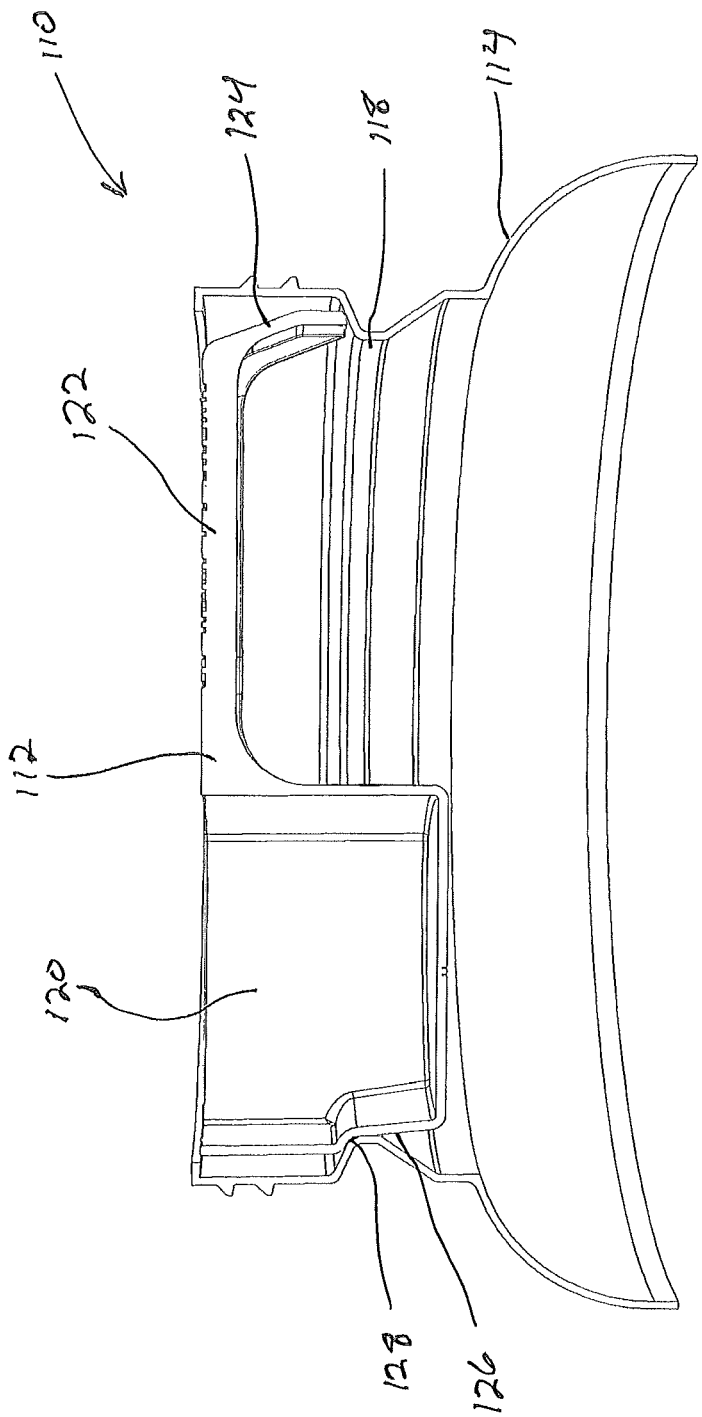
FIG. 10 is a side section view of the integrated measuring scoop apparatus of FIG. 9.

FIGS. 9 and 10 illustrate an alternate embodiment of an integrated measuring scoop apparatus 110 also having a measuring scoop 112 and a mounting ring 114. The mounting ring 114 can be integrally molded with, a container (not shown). The mounting ring 114 may be provided with any shape corresponding to the desired shape of the container with which it is to be used.

The mounting ring 114 is provided with threads on an outer surface of the ring 114 to engage mating threads on the inside of a screw-on cap used with the container. Alternately, the mounting ring 114 may be provided with a hinged connection with the cap, in which case the hinge and the cap may remain separate components or the mounting ring, hinge, and cap may be integrally molded. The mounting ring 114 may also alternately be provided with snap ring on its exterior surface to enable a snap fit with the cap.

In this embodiment, the mounting protrusion 118 is in the form of a continuous, inwardly extending bead running along the interior of the mounting ring 114. The mounting protrusion is provided with an upper surface that has a slight incline or is horizontal. The mounting protrusion 118 is preferably consistent in its cross-sectional dimensions along its length.

The measuring scoop 112 is provided with a bowl 120 and a handle, 122. The length of the measuring scoop, measured from the end of the bowl 120 to the end of the handle 122, corresponds to the inside diameter of the mounting ring 114, more specifically, being only slightly less than the inside diameter of the mounting ring 114. This allows the measuring scoop 112 to fit within the mounting ring 114 while ensuring the necessary level of contact between the ends of the measuring scoop 112 and the mounting protrusion 118 of the mounting ring 114.

The bowl 120 of the measuring scoop 112 may be providing with any shape. However, in illustrated embodiment, the bowl 120 will have a generally round or oval shape that roughly allows the edge of the bowl 120 to follow the curvature of the mounting ring 114. In embodiments where the container, and thus the mounting ring 114, are rectangular, square or another shape, it will be advantageous to use a bowl 120 shape that generally allows the edge of the bowl 120 to follow and conform with the interior of the mounting ring 114. This helps ensure proper engagement between the bowl end of the measuring scoop 112 and the protrusion 118 that will support it.

Similarly, the end of the handle 122 of the measuring scoop 112 may be provided with a shape that corresponds with that of the mounting ring 114. In addition, the end of the handle 122 is provided with a downwardly extending flange 124. The flange 124 allows the scoop 112 to lie horizontally while still having the handle end engage the mounting protrusion 118.

The bowl 120 is provided with a recessed area 126, preferably at the lower front surface of the bowl 120. This recessed area 126 creates a downwardly facing support surface 128 that engages the upper surface of the protrusion 118 when the scoop 112 is placed within the mounting ring 114. In one embodiment, the downwardly extending flange 124 of the handle 122 has a slightly outwardly angled upper half and a more vertical lower half. The bottom end of the flange 124 rests on the upper surface of the protrusion when the scoop 112 is placed within the mounting ring 114. The arrangement of the flange makes positioning of the scoop 112 within the mounting ring 114 easier. The above described arrangement results in the scoop 112 being positionable at any horizontal orientation within the mounting ring 114.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

What is claimed is:

1. A container having an integrated measuring scoop, comprising:
   a cap having a skirt portion and a lid portion;
   a container body including an upper rim, wherein the lid portion of the cap abuts the container body upon engagement of the cap the container body;
   a mounting ring integrally connected to said container body, said mounting ring having at least one first mounting protrusion extending inwardly from an inner surface of said mounting ring;
   a measuring scoop having a bowl and an handle; and
   a first recessed area in an exterior surface of said bowl and terminating in a first upper support surface, said first upper support surface arranged for engagement of an upper surface of said at least one first mounting protrusion, and said handle arranged for engagement with said upper surface of said at least one first mounting protrusion;
   wherein said measuring scoop is positioned entirely beneath the lid portion of the cap and entirely within said container body and even with or below said upper rim of said container body upon at least one of:
   engagement of said first recessed area of said bowl with said at least one first mounting protrusion, and engagement of said handle with said at least one first mounting protrusion.

2. The container as set forth in claim 1, wherein:
   said first mounting protrusion comprises first and second protrusions extending inwardly from said inner surface of said mounting ring at approximately 180° from one another along the inner circumference of said mounting ring;
   said first recessed area of said bowl comprises a first vertical slot terminating in said first upper support surface; and
   further comprising a second vertical slot in said handle and terminating in a second upper support surface, said first and second vertical slots arranged for sliding engagement with said first and second protrusions of said mounting ring.

3. The container as set forth in claim 2, wherein said first and second protrusions are provided with identical dimensions.

4. The container as set forth in claim 2, wherein said handle further comprises a downwardly extending flange at an end of said handle opposite of said bowl and wherein said second vertical slot is arranged in said flange.

5. The container as set forth in claim 1, wherein said mounting protrusion comprises a continuous, inwardly extending bead that is provided with a consistent cross-sectional shape and dimensions along its circumference.

6. The container as set forth in claim 1, wherein said mounting protrusion is integrally molded with said mounting ring.

7. The container as set forth in claim 1, wherein said handle further comprises a downwardly extending flange at an end of said handle opposite of said bowl.

8. The container as set forth in claim 7, wherein said downwardly extending flange further comprises a first, angled portion and a second vertical portion, said second, vertical portion arranged at a lower end of said flange.

9. A container having an integrated measuring scoop, comprising:
   a container body including an upper rim;
   a container top having a skirt portion and a lid portion, wherein the lid portion abuts the container body upon engagement of the container top with the container body;
   a mounting ring integrally connected with an upper portion of said container body, said mounting ring having at least a first mounting protrusion extending inwardly from an inner surface of said mounting ring, said mounting ring further comprising means for removably connecting said container top with said mounting ring to close said container;
   a measuring scoop having a bowl and an handle; and
   a first recessed area in an exterior surface of said bowl and terminating in a first upper support surface, said first upper support surface arranged for engagement of an upper surface of said at least one first mounting protrusion, and said handle arranged for engagement with said upper surface of said at least one first mounting protrusion;
   wherein said measuring scoop is positioned entirely beneath the lid portion of the container top and entirely within said container body and even with or below said upper rim of said container body upon at least one of:
   engagement of said first recessed area of said bowl with said at least one first mounting protrusion, and engagement of said handle with said at least one first mounting protrusion.

10. The container as set forth in claim 9, wherein:
said first mounting protrusion comprises first and second protrusions extending inwardly from said inner surface of said mounting ring at approximately 180° from one another along the inner circumference of said mounting ring;
said first recessed area of said bowl comprises a first vertical slot terminating in said first upper support surface; and
further comprising a second vertical slot in said handle and terminating in a second upper support surface, said first and second vertical slots arranged for sliding engagement with said first and second protrusions of said mounting ring.

11. The container as set forth in claim 10, wherein said first and second protrusions are provided with identical dimensions.

12. The container as set forth in claim 10, wherein said handle further comprises a downwardly extending flange at an end of said handle opposite of said bowl and wherein said second vertical slot is arranged in said flange.

13. The container as set forth in claim 9, wherein said mounting protrusion comprises a continuous, inwardly extending bead that is provided with a consistent cross-sectional shape and dimensions along its circumference.

14. The container as set forth in claim 9, wherein said mounting protrusion is integrally molded with said mounting ring.

15. The container as set forth in claim 9, wherein said handle further comprises a downwardly extending flange at an end of said handle opposite of said bowl.

16. The container as set forth in claim 15, wherein said downwardly extending flange further comprises a first, angled portion and a second vertical portion, said second, vertical portion arranged at a lower end of said flange.

* * * * *